3,062,776
COMPOSITION COMPRISING (A) REACTION PRODUCT OF AN ALDEHYDE AND AN ACRYLAMIDE COPOLYMER, (B) AN ACRYLIC COPOLYMER, AND (C) A POLYESTER RESIN
Norman G. Gaylord, New Providence, N.J., assignor to Interchemical Corporation, New York, N.Y., a corporation of Ohio
No Drawing. Filed Feb. 26, 1960, Ser. No. 11,134
18 Claims. (Cl. 260—45.4)

This invention relates to new thermosetting coating compositions. More particularly, it relates to coating compositions comprising blends of low molecular weight organic solvent soluble acrylic copolymers, alkylolated acrylamide copolymers and polyester resins.

The resulting compositions are heat curable to yield very durable surface coatings which are well cured, hard, flexible, display good color and gloss and good color and gloss retention even after extensive curing by baking and rebaking. In addition, these surface coatings display an excellent resistance to weathering, solvents, salt spray, soaps and detergents.

The new composition of this invention comprises essentially a blend of three major components.

A. The reaction product of an (1) aldehyde and a copolymer comprising an acrylamide and at least one other ethylenically unsaturated monomer.

B. An acrylic copolymer made by the addition polymerization of a mixture of monomers comprising from 5% to 30% by weight of a non-allylic alcohol containing the norbornene nucleus and an ethylenically unsaturated ester material having the formula

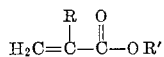

in which R is a member selected from the group consisting of hydrogen and methyl, and R' is an alkyl radical containing from 1 to 8 carbon atoms.

C. A polyester resin comprising the reaction product of (1) an aromatic dicarboxylic acid such as isophthalic acid or products formed by the condensation of terpenes with maleic anhydrides, (2) alpha,beta ethylenic dicarboxylic acids such as maleic anhydride and fumaric acid or aliphatic dicarboxylic acids having a chain length of 6–10 carbons, (3) an aliphatic monocarboxylic acid having a chain length of 8 to 12 carbon atoms, (4) a dihydric alcohol and (5) a polyhydric alcohol having at least 3 hydroxyl groups.

The acrylamide containing copolymers used in this invention may be prepared by any of the conventional methods well known to those skilled in the art. U.S. Patent No. 2,173,005, issued September 12, 1939, to Daniel E. Stain gives one process for preparing acrylamide containing copolymers. Acrylamide monomers may be copolymerized with a wide variety of ethylenically unsaturated monomers including acrylic or methacrylic acids and their esters, particularly methyl acrylate, ethyl acrylate, butyl acrylate, hexyl acrylate and octyl acrylate; nitriles of acrylic and methacrylic acids; vinyl halides; styrene and vinyl toluene; maleic acid and esters thereof; vinyl ethers; vinyl acetones, particularly methyl vinyl ketone, dibutyl maleate; vinyl pyridines; 2-chloro-butadiene-1,3 etc. It will be obvious to those skilled in the art that mixtures of the above monomers may be copolymerized with acrylamide monomers to give copolymers of widely varying properties. In other words by the proper selection of monomers and proportions, acrylamide containing copolymers may be made to have specific hardness and flexibility characteristics. In the practice of this invention, it is preferred to use acrylamide copolymers containing substantial amounts of styrene or vinyl toluene, and methyl methacrylate or ethyl acrylate. The proportions are not critical. It is also preferable to include small quantities of methacrylic or acrylic acid.

In producing the acrylamide copolymer, the acrylamide monomer is first copolymerized with the other ethylenically unsaturated monomers and the aldehyde is reacted with the copolymerization product. The entire reaction is preferably conducted in solution. The selected solvent must be one in which the acrylamide, the ethylenically unsaturated monomers and the aldehyde must be soluble. Aliphatic alcohols as methanol, ethanol and butanol are preferable as solvents with the butanol being the most preferable of these. Ethylene glycol monomethyl ether and acetone may also be used as solvents either alone or in combination with other solvents. It should be noted that the preferred solvents may be cut or mixed with aromatic hydrocarbon solvents such as xylene.

The copolymerization of the monomers to form the acrylamide copolymers is initiated by "catalysts" or polymerization initiators of the free radical type. The most commonly used initiators are azo compounds and organic peroxygen compounds. Typical of the azo compounds that may be used for this purpose are azobisisobutyronitrile, and azobisisovaleronitrile. Typical of the organic peroxygen compounds that may advantageously be used as copolymerization initiators are such compounds as cumene hydroperoxide, tertiary butyl perbenzoate, peracetic acid, acetyl peroxide, perbenzoic acid, benzoyl peroxide, lauroyl peroxide, stearoyl peroxide, ditertiary butyl peroxide, tertiary butyl hydroperoxide, methyl ethyl ketone-hydrogen peroxide adduct and cyclohexanone-hydrogen peroxide adduct.

It is desirable that the acrylamide copolymers have a low molecular weight in order to insure solubility thereof in the solvent used for the coating compositions of this invention. Accordingly, it is preferable to add "chain stoppers" during the polymerization of the acrylamide copolymer. Mercaptans such as dodecyl mercaptans, hexyl mercaptans and octyl mercaptans are conventionally used.

While formaldehyde is used in methylolating the condensation product, it will be obvious that other aldehydes may be used to alkylolate the condensation product. While not critical, it is preferable to react 2 equivalents of formaldehyde for every 1 equivalent of acrylamide in the copolymer.

It should be noted that in the case the reactions are conducted in alkanol solvents such as butanol in the present case, the alkylol or methylol groups on the final product become etherified to alkoxyalkylol groups or in the case where formaldehyde is used in butanol, the condensation product is butoxymethylolated.

Where formaldehyde is to be used for methylolation in a butanol solvent, it has been found to be commercially convenient to use a commercial product known as Butyl Formcel which is a butanol solution containing 40% by weight of formaldehyde.

The norbornene nucleus containing acrylic copolymers are defined in copending application Serial No. 768,839, filed October 22, 1958, now Patent No. 2,985,611 as a low molecular weight organic solvent soluble acrylic copolymer produced by the addition polymerization of a mixture of monomers comprising (1) a minor portion of a non-allylic alcohol containing the norbornene nucleus, (2) a major proportion of an ester of a mixture of esters selected from the group consisting of the alkyl esters of acrylic and methacrylic acid in which the alkyl groups contain from one to eight carbon atoms. The non-allylic alcohol containing the norbornene nucleus will ordinarily constitute about 5–30% of the copolymerization mixture, and the $C_1$–$C_8$ alkyl esters of acrylic and/or methacrylic acids will usually constitute from about 50% to about 95% of the copolymerization mixture. Preferably, there will also be present in the copolymerization mixture certain modifiers in amount about 2–35%. These modifiers include acids such as acrylic and methacrylic; nitriles, such as acrylonitrile and methacrylonitrile; vinyl esters, such as vinyl acetate, vinyl propionate and vinyl stearate; esters of unsaturated dibasic acids, such as dimethyl maleate and dibutyl fumarate; styrene, alpha-methyl styrene, and the various vinyl toluenes; amides, such as acrylamide, methacrylamide, methylolacrylamide, and methylol methacrylamide; hydroxy compounds such as ethylene glycol monoacrylate or monomethacrylate, glycerol monoacrylate or monomethacrylate, glycerol allyl ether, and vinyl alkyl ethers such as vinyl butyl ether, vinyl ethyl ether, vinyl hexyl ether, etc.

With respect to the non-allylic alcohols containing the norbornene nucleus it should be noted that norbornene has the formula:

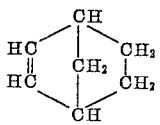

While for the purposes of describing the present invention, reference will be made mostly to copolymers of 2-hydroxymethyl-5-norbornene which has the following structure:

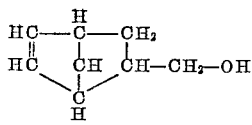

it will be understood that related homologs can readily be used and it is intended that the appended claims will cover the use of such compounds.

2-hydroxymethyl-5-norbornene is readily prepared by condensing allyl alcohol with cyclopentadiene (U.S. Patent No. 2,596,279 and No. 2,352,606). Alkyl substituted cyclopentadienes behave similarly to yield corresponding substituted derivatives. Likewise compounds containing two alcoholic hydroxyl groups can be obtained by condensing an unsaturated diol, such as butenediol with cyclopentadiene.

These acrylic copolymers are prepared in solution by addition polymerization initiated by conventional free radical type initiators which have been described fully hereinabove. Benzoyl peroxide is preferably used as an initiator in the polymerization. Xylene is preferably used as the solvent although other conventional solvents such as benzene, ethyl benzene or toluene may be used.

In a further embodiment of this invention epoxy resin-acrylic graft copolymers which are more fully described in copending application Serial No. 808,887, April 24, 1959, may be used in place of the acrylic copolymers. These graft copolymers are prepared by the above described method for preparing the norbornene nucleus containing acrylic copolymers and using the same ingredients except that said monomers are polymerized by addition polymerization in the presence of epoxy resins.

The epoxy resins used in preparing the graft copolymers of application Serial No. 808,887 are conventionally prepared by reacting a polyhydric phenol, particularly Bisphenol A with epichlorohydrin. Bisphenol A is a mixture of 4,4′-dihydroxy diphenyl dimethyl methane with lesser quantities of its 2,2′-isomer and its 4,2′-isomer. By regulating the proportions of these two reactants, the molecular size and the molecular structure of the ethoxyline resins produced may be controlled. By using an excess of epichlorohydrin, a low molecular weight ethoxyline resin is produced. By increasing the amount of Bisphenol A used, higher molecular weight epoxy resins are produced. In the preparation of these graft copolymers, it is preferable to use epoxy resins having molecular weights of 350 to 875, epoxide equivalent weights of 175 to 525 and an average of 1.7 to 1.9 epoxies per molecule. We have found best results are secured when epoxy resins having a molecular weight of 875, an epoxide equivalent weight of 485 and an average of 1.7 to 1.9 epoxide groups per molecule, such as "Epon 1001." While it is not critical, it is preferred to have the epoxy resin constitute 9 to 37% parts by weight of the total starting reactants in the preparation of the graft copolymer.

The polyester resins blended with the above described ingredients to provide the coating composition of this invention comprises the esterification product of the following components. It should be noted that the proportions are not considered to be critical. The ranges given are those which yield the most desirable results.

(1) Aromatic dicarboxylic acid 26 to 32% by weight includes isophthalic acid and phthalic anhydride. The Petrex acids, which are resinous polybasic acids formed by the condensation of terpenes with maleic anhydride may be used in place of the aromatic acids.

(2) 7–10% by weight of an alpha-beta ethylenic dicarboxylic acid such as maleic anhydride and fumaric acid or 7–10% by weight of aliphatic dicarboxylic acids having a chain length 6–10 carbons such as adipic, azelaic and sebacic acids.

(3) 23–32% weight of an aliphatic monocarboxylic acid having a chain length of 8–12. These include caprylic, pelargonic, capric and lauric acids.

(4) 13–29% by weight of a dihydric alcohol such as 1,3 butylene glycol, neopentylglycol and 1,4 butandiol.

(5) 9–22% by weight of a polyhydric alcohol having at least 3 hydroxyl groups. These include trimethylol ethane, tri-(methylol, propane), and 1,2,6 hexane triol. The polyester resins are prepared in solution with xylene, benzene or toluene being the preferred solvents.

In preparing the novel blends of this invention solutions of the alkoxyalkylated acrylamide-epoxy resin condensation copolymers are blended with solutions of the acrylic copolymers or acrylic-epoxy resin graft copolymers and solutions of the polyester resins. While not critical it is preferable to blend the three components in the following ratios which are given by weight on a solids basis:

| | Parts by weight |
|---|---|
| Alkoxyalkylated acrylamide copolymer | 4 to 8 |
| Polyester resin | 1 to 2 |
| Acrylic copolymer or acrylic-epoxy resin graft copolymer | 1 to 4 |

It should also be noted that the novel compositions of this invention have excellent pigment dispersing properties and that these may be readily pigmented to yield pigmented coatings upon curing.

The following examples will illustrate the practice of this invention.

EXAMPLE 1

| Group A: | G. |
|---|---|
| Styrene | 1200 |
| Ethyl acrylate | 112 |
| Methacrylic acid | 48 |
| Acrylamide | 240 |
| Butanol | 800 |
| Xylene | 800 |
| Cumene hydroperoxide | 16 |
| Tert-dodecyl mercaptan | 16 |
| B. Tert-dodecyl mercaptan | 16 |
| C. Tert-butyl perbenzoate | 8 |
| D. Butyl Formcel | 505 |

Group A is charged into the reaction flask and heated at reflux, approximately 120° C., for one hour. B is added and heating at reflux is continued for 3 hours. C is added and heating at reflux is continued for 2 hours. The total solids content after the 6 hour reaction period is 44.8% and the resin solution has a Gardner-Holdt viscosity of W. D is added and the reflux temperature of 150° C. is maintained for 3 hours. The final solids content is 44.9% by weight and the resin solution has a Gardner-Holdt viscosity of U–V.

EXAMPLE 2

Group A: | G.
---|---
Methyl methacrylate | 424
Acrylamide | 75
Ethylene glycol monomethyl ether | 500
Cumene hdroperoxide | 5
Tert-dodecyl mercaptan | 10
B. Tert-dodecyl mercaptan | 5
C. Tert-butyl perbenzoate | 2.5
D. Butyl Formcel | 158

Group A is charged into the reaction flask and heated at reflux, approximately 108° C., for 1 hour. B is added and heating at reflux is continued for 3 hours. C is added and heating at reflux is continued for 2 hours. The total solids content by weight after 6 hours of reaction is 51.0%. D is added and reflux is maintained for 3 hours. The final solids content is 48.5%.

EXAMPLE 3

Group A: | G.
---|---
Butyl acrylate | 200
Methyl methacrylate | 250
Acrylamide | 50
Butanol | 250
Xylene | 250
Cumene hydroperoxide | 5
Tert-dodecyl mercaptan | 5
B. Tert-dodecyl mercaptan | 5
C. Tert-butyl perbenzoate | 25
D. Butyl Formcel | 105

Group A is charged into the reaction flask and heated at reflux, approximately 114° C., for 1 hour. B is added and heating at reflux is continued for 3 hours. C is added and heating at reflux is continued for 2 hours. The total solids content by weight after 6 hours of reflux is 49.0%. D is added and reflux is maintained for 3 hours while water is removed by distillation. The final solids content is 47.2% by weight and the resin solution has a Gardner-Holdt viscosity of Z.

EXAMPLE 4

Group A: | G.
---|---
Vinyl toluene | 300
Ethyl acrylate | 150
Acrylamide | 50
Butanol | 250
Xylene | 250
Cumene hydroperoxide | 5
Tert-dodecyl mercaptan | 5
B. Tert-dodecyl mercaptan | 5
C. Tert-butyl perbenzoate | 2.5
D. Butyl Formcel | 105

Group A is charged into the reaction flask and heated at reflux, approximately 117° C., for 1 hour. B is added and heating at reflux is continued for 3 hours. C is added and heating at reflux is continued for 2 hours. The total solids content by weight after the 6 hour reaction period is 46.5% and the resin solution has a Gardner-Holdt viscosity of R–S. D is added and the reflux temperature is maintained for 3 hours while water is azeotropically distilled. The final solids content by weight is 47.2% and the resin solution has a Gardner-Holdt viscosity of P.

EXAMPLE 5

Group A: | G.
---|---
2-hydroxymethyl-5-norbornene | 89.0
Xylene | 246.9
Group B: |
Butyl acrylate | 362.0
Methyl methacrylate | 21.4
Methacrylic acid | 21.4
Xylene | 246.9
Benzoyl peroxide | 9.9
C. Benzoyl peroxide | 2.5

Group A is charged into the reaction vessel and heated with stirring under nitrogen to 90° C. Group B is added dropwise over a period of 1½ hours while the temperature is maintained at 90° C., with intermittent cooling, if necessary. C is added 1½ hours after the completion of the dropwise addition of B. The temperature is maintained at 90° C. for an additional 1½ hours, and then the temperature is raised to 125° C. for 1 hour to destroy residual catalyst. The final copolymer solution has a 45.4% non-volatile content indicating a 90.8% conversion of monomers to polymer.

EXAMPLE 6

Group A: | G.
---|---
2-hydroxymethyl-5-norbornene | 342
Xylene | 900
Group B: |
Butyl acrylate | 1320
Methyl methacrylate | 78
Methacrylic acid | 78
Xylene | 900
Benzoyl peroxide | 36
C. Benzoyl peroxide | 9

Group A is charged into a flask and heated under nitrogen to 90° C. Group B is added dropwise over a period of 2.5 hours while maintaining the temperature at 90° C. C is added 30 minutes after the completion of the addition of B. After an additional 1.5 hours, for a total of 4.5 hours, at 90° C., the temperature is raised to 125° C. for one hour to destroy residual catalyst. The total solids content by weight is 44.7% indicating an 89.4% conversion of monomers to polymer.

EXAMPLE 7

Group A: | G.
---|---
2-hydroxymethyl-5-norbornene | 135.0
Xylene | 450.0
Group B: |
Ethyl acrylate | 675.0
Methacrylic acid | 90.0
Xylene | 450.0
Benzoyl peroxide | 18.0
C. Benzoyl peroxide | 4.5
D. Benzoyl peroxide | 4.5
E. Benzoyl peroxide | 4.5

Group A is charged into the reaction vessel and heated with stirring under nitrogen to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for 3 more hours when D is added. The temperature is maintained at 90° C. for 3 hours and E is added. The temperature is maintained at 90° C. for 3 hours. The temperature is then raised to 125° C. for one hour to destroy residual catalyst. The final copolymer solution has a 46.4% nonvolatile content indicating a 92.8% conversion of monomer to polymer.

EXAMPLE 8

Group A: | G.
---|---
2-hydroxymethyl-5-norbornene | 90.0
Xylene | 450.0
Group B: |
Butyl acrylate | 315.0
Methyl methacrylate | 270.0
Ethyl hexyl acrylate | 180.0
Methacrylic acid | 45.0
Xylene | 450.0
Benzoyl peroxide | 18.0
C. Benzoyl peroxide | 4.5
D. Benzoyl peroxide | 4.5

Group A is charged into the reaction vessel and heated with stirring under nitrogen to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for an additional 3 hours when D is added. The temperature is maintained at 90° C. for 3 more hours when the temperature is raised to 125° C. for 1 hour to destroy residual catalyst. The final copolymer solution has a 46.3% non-volatile content indicating a 92.6% conversion of monomers to polymer.

EXAMPLE 9

Group A: G.
2-hydroxymethyl-5-norbornene _____ 135.0
Xylene _____ 450.0
Group B:
Methyl methacrylate _____ 720.0
Methacrylic acid _____ 45.0
Xylene _____ 450.0
Benzoyl peroxide _____ 18.0
C. Benzoyl peroxide _____ 4.5
D. Benzoyl peroxide _____ 4.5

Group A is charged into the reaction vessel and heated with stirring under nitrogen to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for 3 more hours when D is added. The temperature is maintained at 90° C. for an additional 3 hours when temperature is raised to 125° C. for 1 hour to destroy residual catalyst. The final copolymer solution has a 45.5% non-volatile content indicating a 91% conversion of monomers to polymers.

EXAMPLE 10

Group A: G.
Petrex acids _____ 774
Maleic anhydride _____ 177
Pelargonic acid _____ 570
Neopentyl glycol _____ 699
Trimethylol ethane _____ 240
Xylene _____ 246

All the ingredients are charged into a flask and heated to the azeotropic distillation temperature of 165–170° C. The temperature is slowly raised over a period of 5 hours to 230–240° C., and held at that temperature for approximately an additional 5 hours until an acid number of 11–13 is reached. The solids are adjusted with xylene to 60% solids by weight. The solution has a Gardner-Holdt viscosity at 25° C. of L or 3.00 poises.

EXAMPLE 11

Group A: G.
Isophthalic acid _____ 299
Fumaric acid _____ 104
Lauric acid _____ 360
Neopentyl glycol _____ 168.5
Trimethylol ethane _____ 216
B. Xylene _____ 57

Charge Group A into a flask and heat under air cooled condenser and $CO_2$ atmosphere to 165–170° C. Raise temperature to 235–240° C. over 3 hours and hold until clear. Cool to 170° C., charge B and azeotropically distill to an acid value of 9–11. Cool. Cut batch to 60% TNV in xylene. The solution has a Gardner-Holdt viscosity of G–H.

EXAMPLE 12

Group A: G.
Isophthalic acid _____ 299
Adipic acid _____ 131
Pelargonic acid _____ 288
Neopentyl glycol _____ 168.5
Trimethylol ethane _____ 216
B. Xylene _____ 55

Group A is charged into a flask and heated under a $CO_2$ atmosphere with air cooled condenser to 165–170° C. The temperature is raised to 235–240° C. in 3 hours and held until clear. The mixture is cooled to 170° C. and B is added and azeotropic distillation is continued until an acid value of 9 is reached. The mixture is cooled and cut to 60% TNV in xylene. The solution has a Gardner-Holdt viscosity of E–F.

EXAMPLE 13

Group A: G.
Isophthalic acid _____ 299
Fumaric acid _____ 104
Pelargonic acid _____ 288
Neopentyl glycol _____ 168.5
1,2,6-hexane triol _____ 241
B. Xylene _____ 55

Charge A into a flask and heat under $CO_2$ and air-cooled condenser to 165–170° C. Raise temperature to 235–240° C. over 3 hours and hold until clear. Cool to 170° C., and add B, and azeotrope to an acid value of 9. Cool. Cut batch to 60% TNV in xylene. The solution has a Gardner-Holdt viscosity of M–N.

EXAMPLE 14

Group A: G.
Isophthalic acid _____ 299
Fumaric acid _____ 104
Pelargonic acid _____ 288
Neopentyl glycol _____ 192
Trimethylol propane _____ 220
B. Xylene _____ 55

Charge Group A into a flask and heat under $CO_2$ and air-cooled reflex to 17–170° C. Raise temperature to 235–240° C. in 3 hours and hold until clear. Cool to 170° C., add B and azeotrope to an acid value of 9. Cool. Cut batch to 60% TNV with xylene. Solution viscosity is E–F on Gardner-Holdt scale.

EXAMPLE 15

Group A: Lbs.
Isophthalic acid _____ 20.5
Fumaric acid _____ 7.11
Pelargonic acid _____ 19.70
1,3 butylene glycol _____ 9.99
Trimethylol ethane _____ 14.80
B. Xylene _____ 2.88
C. Xylene _____ 15.0

Charge Group A into a flask. Heat under carbon dioxide to 175° C.–180° C. Water of reaction will be evolved. Raise temperature over three hours to 235° C. Cool to 170° C. and add B. Reheat to azeotropic distillation temperature 220° C.–240° C. for acid number of solids contained of 10–11. Cut batch with C to 60% TNV. Filter batch.

EXAMPLE 16

Group A: G.
Epon 1001 _____ 450
2-hydroxymethyl-5-norbornene _____ 270
Xylene _____ 750
Group B:
Butyl acrylate _____ 1100
Methyl methacrylate _____ 65
Methacrylic acid _____ 65
Xylene _____ 750
Benzoyl peroxide _____ 30
C. Benzoyl peroxide _____ 7.5

Group A is charged to a flask and heated with stirring under nitrogen to 90° C. Group B is added dropwise over a period of 2.5 hours at 90° C. C is added 30 minutes after the addition of B is completed. After an additional 1.5 hours, for a total of 4.5 hours, at 90° C., the temperature is raised to 125° C. for one hour to destroy residual catalyst. The total solids content by weight is 54.4%.

EXAMPLE 17

1 part by weight of the polyester resin prepared in Example 10 is blended with 1 part by weight of acrylic polymer prepared in Example 5 and 8 parts by weight of the acrylamide copolymer prepared in Example 1. The resulting blend is drawn down on a steel panel and baked at 350° F. for 30 minutes. The baked film is well cured, hard, clear, flexible, and displays high gloss and good color as well as a high resistance to solvents, soaps and detergents.

The blend of this example may be pigmented with any of the standard enamel varnish pigments. 60 parts by weight of the blend are mixed with 40 parts by weight of $TiO_2$ pigment, drawn down on a steel panel and baked in accordance with the above schedule. The resulting film displays properties equivalent to those of the unpigmented film, and in addition panels having the cured pigmented film when rebaked at 204° C. for 1 additional hour display excellent color retention.

The following blends when prepared and cured in accordance with the procedure described in Example 17 provide cured films having properties equivalent to those described in Example 17, both in the pigmented and unpigmented state.

Table I

| Blends | Polyester resin prepared in— | Parts in Weight | Acrylic Copolymer prepared in— | Parts in Weight | Acrylamide Copolymer prepared in— | Parts in Weight |
|---|---|---|---|---|---|---|
| Example 18 | Ex. 10 | 1 | Ex. 5 | 2 | Ex. 1 | 7 |
| Example 19 | Ex. 10 | 1 | Ex. 6 | 2 | Ex. 1 | 7 |
| Example 20 | Ex. 10 | 1 | Ex. 6 | 1 | Ex. 1 | 8 |

The following blends listed in Table II are prepared in accordance with the procedure described in Example 17 as unpigmented films. These cured films display properties equivalent to those of the film of Example 17.

Table II

| Blends | Polyester resin prepared in— | Parts in Weight | Acrylic Copolymer prepared in— | Parts in Weight | Acrylamide Copolymer prepared in— | Parts in Weight |
|---|---|---|---|---|---|---|
| Example 21 | Ex. 11 | 2 | Ex. 5 | 4 | Ex. 1 | 4 |
| Example 22 | Ex. 12 | 2 | Ex. 5 | 4 | Ex. 1 | 4 |
| Example 23 | Ex. 13 | 2 | Ex. 5 | 4 | Ex. 1 | 4 |
| Example 24 | Ex. 14 | 2 | Ex. 5 | 4 | Ex. 1 | 4 |
| Example 25 | Ex. 15 | 2 | Ex. 5 | 4 | Ex. 1 | 4 |
| Example 26 | Ex. 11 | 1 | Ex. 7 | 2 | Ex. 2 | 7 |
| Example 27 | Ex. 13 | 1 | Ex. 8 | 2 | Ex. 3 | 7 |
| Example 28 | Ex. 12 | 1 | Ex. 9 | 2 | Ex. 4 | 7 |

Table III listed blends having epoxy resin containing acrylic graft copolymers. Films of these blends when drawn down on a steel panel and cured in accordance with the procedure set forth in Example 17 provide films having properties equivalent to the properties of the films of Example 17.

Table III

| Example Number | Polyester resin prepared in— | Parts in Weight | Graft Copolymer prepared in— | Parts in Weight | Acrylamide Copolymer prepared in— | Parts in Weight |
|---|---|---|---|---|---|---|
| 29 | Ex. 10 | 1 | Ex. 5 | 2 | Ex. 1 | 7 |
| 30 | Ex. 10 | 1 | Ex. 5 | 3 | Ex. 1 | 6 |
| 31 | Ex. 11 | 2 | Ex. 5 | 4 | Ex. 1 | 4 |
| 32 | Ex. 12 | 2 | Ex. 5 | 4 | Ex. 1 | 4 |
| 33 | Ex. 13 | 2 | Ex. 5 | 4 | Ex. 1 | 4 |

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of this invention.

What is claimed is:

1. A thermosetting composition comprising:
   (A) the reaction product of a lower molecular weight aliphatic monoaldehyde and a copolymer of acrylamide and at least one other ethylenically unsaturated monomer,
   (B) an acrylic copolymer made by the addition polymerization of a mixture of monomers comprising from 5% to 30% by weight of a nonallylic alcohol containing the norbornene nucleus and an ethylenically unsaturated ester material having the formula:

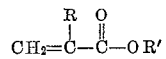

in which R is a member selected from the group consisting of hydrogen and methyl, and R' is an alkyl radical containing from 1 to 8 carbon atoms, and
   (C) a polyester resin comprising the reaction product of (1) a dicarboxylic acid selected from the group consisting of isophthalic acid and resinous polybasic acids formed by the condensation of terpenes with maleic anhydride, (2) an acidic member selected from the group consisting of maleic anhydride, fumaric acid and adipic acid, (3) an aliphatic monocarboxylic acid selected from the group consisting of pelargonic acid and lauric acid, (4) a dihydric alcohol selected from the group consisting of neopentyl glycol and 1,3 butylene glycol and a polyhydric alcohol having at least 3 hydroxyl groups selected from the group consisting of trimethylol ethane, trimethylol propane and 1,2,6 hexane triol.

2. A thermosetting composition as defined in claim 1 wherein said acrylic copolymer is polymerized in the presence of 9% to 37% by weight of an epoxy resin having the formula:

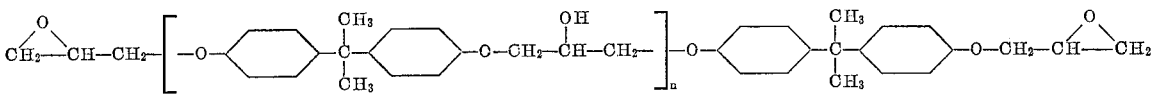

where $n$ is an integer from 0 to 2.

3. A thermosetting composition according to claim 1, wherein said acrylic copolymer comprises the addition polymerization product of a mixture of monomers comprising 2-hydroxymethyl-5-norbornene, butyl acrylate, methyl methacrylate and methacrylic acid.

4. A thermosetting resin according to claim 1, wherein one of the reactants is the reaction product of formaldehyde and a copolymer of styrene, ethyl acrylate, methacrylic acid and acrylamide.

5. A thermosetting resin according to claim 1, wherein one of the reactants is the reaction product of formaldehyde and a copolymer of vinyl toluene, ethyl acrylate and acrylamide.

6. A thermosetting composition according to claim 1, wherein one of the reactants is the reaction product of formaldehyde and a copolymer of methyl methacrylate and acrylamide.

7. A thermosetting composition according to claim 1, wherein said polyester resin comprises the reaction product of isophthalic acid, fumaric acid, lauric acid, neopentyl glycol and trimethylol ethane.

8. A thermosetting composition according to claim 1, wherein said polyester resin comprises the reaction product of a resinous polybasic acid formed by the condensation of terpene and maleic anhydride, pelargonic acid, maleic anhydride, neopentyl glycol and trimethylol ethane.

9. A surface coating composition comprising a volatile organic solvent solution of the composition defined in claim 1.

10. A surface coating composition comprising a volatile organic solvent solution of the composition defined in claim 2.

11. A surface coating composition comprising a volatile organic solvent solution of the composition defined in claim 3.

12. A surface coating composition comprising a volatile organic solvent solution of the composition defined in claim 4.

13. A surface coating composition comprising a volatile organic solvent solution of the composition defined in claim 5.

14. A surface coating composition comprising a volatile organic solvent solution of the composition defined in claim 6.

15. A surface coating composition comprising a volatile organic solvent solution of the composition defined in claim 7.

16. A surface coating composition comprising a volatile organic solvent solution of the composition defined in claim 8.

17. A thermosetting composition according to claim 1 wherein said acrylic copolymer comprises the addition polymerization product of a mixture of monomers comprising 2-hydroxymethyl-5-norbornene, butyl acrylate, methyl methacrylate and methacrylic acid in the presence of 9% to 37% by weight of an epoxy resin having the formula:

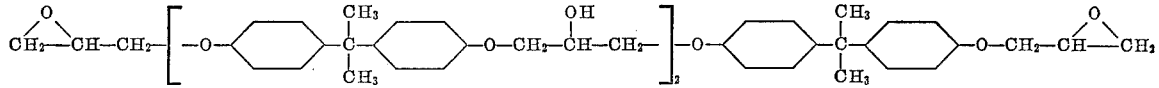

18. A surface coating composition comprising a volatile organic solvent solution of the composition defined in claim 17.

No references cited.